United States Patent
Brendel et al.

(10) Patent No.: US 7,132,037 B2
(45) Date of Patent: Nov. 7, 2006

(54) APPARATUS FOR FORMING AN EXTENDED NIP

(75) Inventors: Bernhard Brendel, Grefrath (DE); Peter Hader, Kempen (DE)

(73) Assignee: Eduard Kusters Maschinenfabrik GmbH & Co. KG, Krefeld (DE)

( * ) Notice: Subject to any disclaimer, the term of this patent is extended or adjusted under 35 U.S.C. 154(b) by 163 days.

(21) Appl. No.: 10/738,954

(22) Filed: Dec. 16, 2003

(65) Prior Publication Data
US 2004/0173107 A1    Sep. 9, 2004

(30) Foreign Application Priority Data
Dec. 17, 2002    (DE) .............................. 102 59 232.2

(51) Int. Cl.
*D21F 3/02*    (2006.01)
*B30B 5/04*    (2006.01)

(52) U.S. Cl. .................. 162/358.3; 100/118; 100/153; 162/272

(58) Field of Classification Search ........ 162/204–207, 162/358.1, 358.3, 358.4, 358.5, 359.1, 360.3, 162/901, 199, 272; 492/7, 20; 100/118, 100/121, 153, 156, 160, 170, 176, 37
See application file for complete search history.

(56) References Cited
U.S. PATENT DOCUMENTS 4,917,768 A * 4/1990 Ilmarinen ................ 162/358.3
5,084,137 A * 1/1992 Ilmarinen et al. ............ 162/272
5,262,011 A * 11/1993 Ilmarinen ................ 162/358.3
5,843,283 A * 12/1998 Henssler et al. ......... 162/358.3
2003/0145971 A1 * 8/2003 Watanabe ................ 162/358.3
2004/0069433 A1 * 4/2004 Rajamaki ................ 162/358.3

FOREIGN PATENT DOCUMENTS

DE           4311622 A1    10/1994
DE         297 01 922     *  5/1997

* cited by examiner

*Primary Examiner*—Eric Hug
(74) *Attorney, Agent, or Firm*—Townsend and Townsend and Crew LLP

(57) ABSTRACT

Apparatus for forming an extended nip between a mating roll and a shoe roll for treating a product web, the shoe roll having a stationary carrier and a flexible roll shell which can rotate around the carrier and which, in the region of the extended nip, is supported on a hydrodynamically lubricated running surface of a press shoe guided on the carrier, for which purpose a device for applying lubricant to the inner side of the roll shell is provided, where, in an inlet region, the press shoe has a plurality of holes which are arranged transversely with respect to the machine running direction, are connected to a lubricant supply in order to be fed with lubricant and, for this purpose, end at the running surface, and the holes comprise restrictors whose resistance is designed for a pressure drop of 5 to 15 bar.

27 Claims, 2 Drawing Sheets

APPARATUS FOR FORMING AN EXTENDED NIP

CROSS-REFERENCES TO RELATED APPLICATIONS

This application claims priority from German application No. 102 59 232.2, filed on Dec. 17, 2002, under 35 USC §119, the full disclosure of which is incorporated herein by reference.

BACKGROUND OF THE INVENTION

The invention relates to an apparatus for forming an extended nip between a mating roll and a shoe roll for treating a product web, in particular a paper web.

Apparatuses for forming extended nips press sections and calender installations of papermaking machines. The lubrication between a rotating roll shell and a stationary press shoe is preferably provided purely hydrodynamically at normal operating speeds. Such hydrodynamic lubrication between the roll shell and the press shoe is produced by lubricating oil being applied upstream of the press shoe, relative to the machine running direction, and being drawn into a drawing-in region by the rotating roll shell and to build up a hydrodynamic lubricating film between the roll shell and the press shoe.

Such hydrodynamic lubrication has the advantage that the pressing pressure profile in the machine running direction from the inlet region of the press shoe initially increases continuously and then, towards the end of the shoe over a relatively short region, decreases to zero. Pressure profiles of this type have process engineering advantages during the dewatering operation in press sections and the calendering operation. A disadvantage of such purely hydrodynamic lubrication is that the lubricating film between shoe and shell is no longer reliably produced, is deficient or is not brought about at all at low speeds and high line loads, i.e., high surface pressures. Such deficient lubrication can lead to mixed friction between shoe and roll shell. External indications of such friction are initially high drive powers or drive torques. The consequence of mixed friction is, firstly, wear phenomena, in particular on the roll shell, and, secondly, high heating of the roll shell, of the press shoe and of the lubricating oil. This can lead to destruction of the roll shell.

These disadvantages in the operating range of low speeds and high line loads can be avoided by additional hydrostatic lubrication, such as oil pockets, with additional lubricating oil introduced into the running surface of the press shoe. Such a static supply of lubricating oil ensures the lubricating function under all operating parameters, but necessitates greater expenditure in construction and fabrication and, in particular, places high requirements on the pressurized oil control. For this purpose, DE 43 11 622 A1 discloses providing the shoe in its surface with recesses, that is to say zones of different spacing from the mating roll, in the machine running direction, the said recesses being used to build up a hydrostatic pressure cushion but being free of any external feed and discharge lines. The revolving shell or the circulating belt drags lubricating oil into these recesses, so that, in the region of these zones, the lubricating oil film therefore has a greater thickness. As a rule, the oil dragged in remains in these zones, so that, at a low operating speed, at which the oil film of a hydrodynamic shoe becomes smaller, since less oil is carried along by the revolving shell, breakdown of the lubricating film can be avoided to the greatest possible extent in the region of the pockets. However, the disadvantage in this case is the influence produced by the recesses on the pressure profile, and also the dependence of the functional ability of the hydrostatic lubrication on the hydrodynamic lubrication.

It is therefore an object of the invention to provide an apparatus for forming an extended nip which permits reliable lubrication in all speed and line force ranges.

BRIEF SUMMARY OF THE INVENTION

An apparatus for forming an extended nip is provided in which the disadvantages in the operating range of low speeds and high line loads are avoided by means of additional lubrication, but the advantages of hydrodynamic lubrication are not surrendered. It is not additional hydrostatic lubrication which is built up; instead, exclusively hydrodynamic lubrication is established. The lubricating oil emerging through the holes can in this case operate as the sole shoe lubrication or as additional shoe lubrication together with a lubricating oil supply at the shoe inlet. The hydrodynamic pressure profile which is optimal for dewatering is maintained. The restricted holes emerge directly at the shoe surface, so that no region of hydrostatic lubrication can form. The required pressure drop can be set via dimensioning of the restrictors.

The lubricating oil emerging through the holes is preferably supplied at a point of the shoe in the machine running direction at which it is more difficult for the lubricating oil to flow back counter to the machine running direction of the roll shell than to be transported along with the roll shell in the machine running direction and thus to contribute to building up the hydrodynamic lubrication. This is preferably the case when the holes are made in a first half of the shoe in the machine running direction, in particular a first third of the shoe. This means that the oil supply is then carried out in a region in which the hydrodynamic pressure is first built up, and therefore still has a considerably lower value than in the region of a second half of the shoe with a maximum shoe pressure. Only a low pressure and therefore a low pump power are necessary in order to convey the oil to the lubricating point.

The lubricating oil emerging through the holes is preferably guided to the shoe surface via holes of small diameter, such as in the range from 0.5 mm to 2.5 mm. The oil supply in such holes is restricted to such a great extent that, in spite of possible pressure differences in the shoe in the cross-machine direction, in particular in the case of pressure drops at the shoe ends, because of lateral oil emergence at the shoe and because of possible profile corrections at the shoe edges in the cross-machine direction, oil always emerges at all the holes belonging to the additional lubrication, in particular even at points of higher pressure. Oil emergence at the holes in the case of locally higher shoe pressures is particularly advantageous and can be ensured by means of selectable restrictor dimensioning, so that lubricating oil on the running surface does not flow backwards via the holes into a feed line and then, when the holes communicate with one another, emerge at points of lower shoe pressure as further additional lubricating oil.

The outlet openings of the holes can be arranged to be distributed over the entire shoe width, transversely with respect to the machine running direction, or else only in specific regions, in particular the edge regions of the shoe, in order to avoid deficient lubrication there. Furthermore, a plurality of rows of outlet openings of the holes can be arranged one after another in the machine running direction, for example a continuous row along the shoe width and in each case an additional row in each case in the edge region of the shoe.

It is preferred to make the outlet openings of the holes at uniform intervals in their regions.

Further refinements of the invention can be gathered from the following description and the subclaims.

The invention will be explained in more detail below using the exemplary embodiments illustrated in the appended figures.

DESCRIPTION OF THE SPECIFIC EMBODIMENTS

Figure 1:
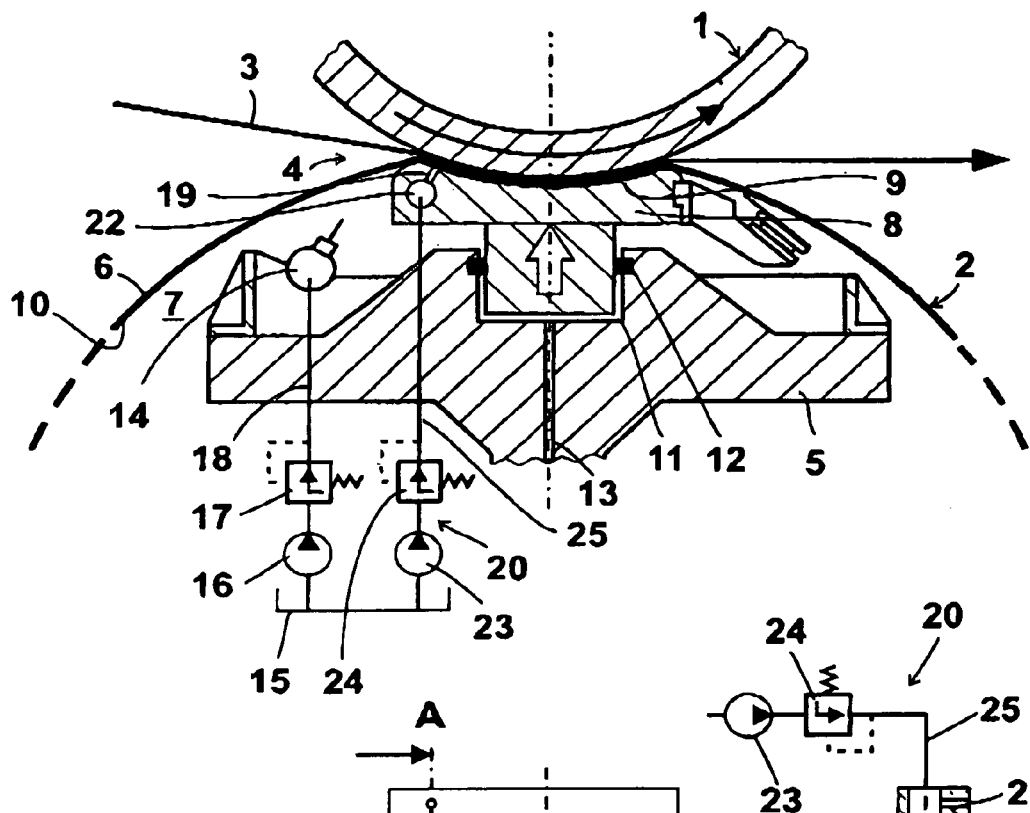
FIG. 1 shows, schematically in cross section, a mating roll and a shoe roll belonging to an apparatus for forming an extended nip according to a first exemplary embodiment.

The invention relates to an apparatus for forming an extended nip between a mating roll 1 and a shoe roll 2 for treating a product web 3, in particular a paper web. Apparatuses of this kind are used in press sections for dewatering a fibrous web, and also in drying sections and calender installations of papermaking machines.

The mating roll 1 is driven in order to transport the product web 3 in a machine running direction through a press nip 4 between the mating roll 1 and the shoe roll 2. The shoe roll 2 comprises a stationary carrier 5, illustrated only in part, and a roll shell 6, which can be rotated about the carrier 5 and consists of a flexible material, for example rubber or plastic. The roll shell 6 is formed in the manner of a tube and is fixed in a known manner by its ends to covers (not illustrated) which are seated on the carrier 5 such that they can rotate, in order to form a closed extended nip apparatus. An interspace 7 between carrier 5 and roll shell 6 can be supplied with compressed air, which means the roll shell 7 can be inflated in order to obtain a cylindrical shape and/or to avoid fluttering of the roll shell 6 during operation.

Provided on the carrier 5 is a press shoe 8, which is guided on the carrier 5 and supported on the latter. A running surface 9 of the press shoe 8 faces an inner side 10 of the roll shell 6 and can be pressed against the said inner side in order to form, with the mating roll 1, an extended pressing zone with a selectable line load. The press shoe 8 can be pressed against the mating roll 1 by loading a press chamber 11. The press chamber 11 is bounded by seals 12 and can be fed with a pressure medium via a feed line 13.

The running surface 9 of the press shoe 8 is lubricated hydrodynamically, for which purpose a first device 14 for applying lubricant to the inner side 10 of the roll shell 6 is provided. A feed line 18, which supplies the device 14 for applying lubricant, is fed from a lubricating oil reservoir 15 via a pump 16 and a pressure regulating valve 17.

The lubricating gap formed between the roll shell 6 and the running surface 9 and belonging to the hydrodynamically lubricated shoe roll 2 is supplied with additional lubricating oil, for which purpose, in an inlet region, the press shoe 8 has a plurality of holes 19 which are arranged transversely with respect to the machine running direction, are connected to a lubricant supply 20 in order to be fed with lubricant, and end with outlet openings 21 on the running surface 9. The holes 19 comprise restrictors, whose resistance is designed for a pressure drop of 5 to 15 bar.

Figure 2:
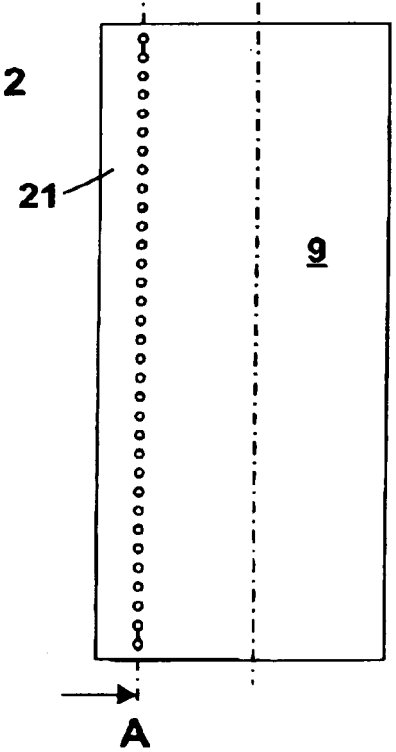
FIG. 2 shows, in schematic form, a plan view of a press shoe belonging to the shoe roll according to FIG. 1.
Figure 3:
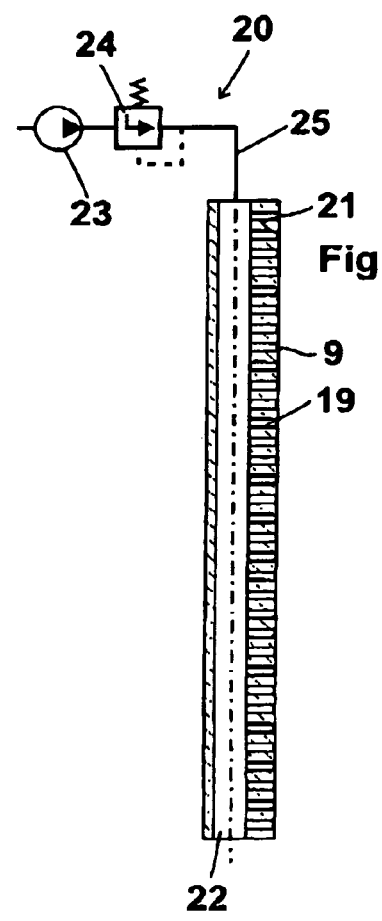
FIG. 3 shows, schematically, a section A—A from FIG. 2.
Figure 4:
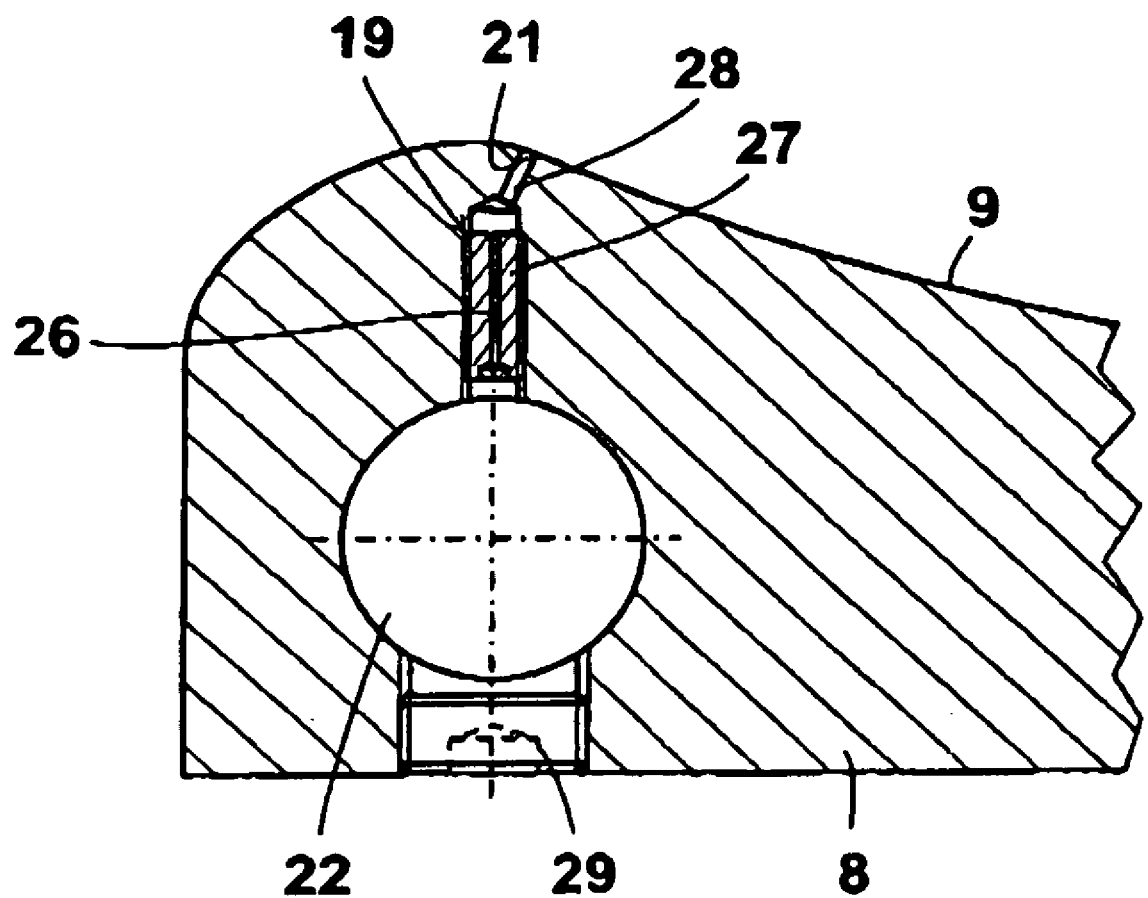
FIG. 4 shows, schematically in cross section, a portion of a press shoe of a shoe roll belonging to an apparatus for forming an extended nip according to a second exemplary embodiment.

In the exemplary embodiment which is illustrated in FIGS. 1 to 3 and which represents a calender press nip, the holes 19 at the same time form the restrictors, that is to say they are designed as restrictor holes, while in the second exemplary embodiment, illustrated in FIG. 4, the restrictors are formed as restrictor inserts 26.

As FIGS. 2 and 3 show, the holes 19 emerge with their outlet openings 21 directly on the running surface 9. The holes 19 are made with their outlet openings 21 in a first half of the shoe 8 in the machine running direction, transversely with respect to the latter. The holes 19 are preferably made with their outlet openings 21 in a first third of the shoe 8 in the machine running direction and, particularly preferably, in a region where the pressing pressure changes from a region with a high pressing pressure slope into a region with a low pressing pressure slope.

The holes 19 can be formed as standard holes with a constant diameter, as illustrated in FIG. 3. The holes 19 can emerge from the running surface 9 with their outlet openings distributed over the entire shoe width, transversely with respect to the machine running direction, as FIG. 2 shows. Here, the outlet openings 21 are arranged in a continuous row. Alternatively, the outlet openings 21 can be offset from one another or be arranged only in the edge regions of the running surface 9 or in two or more rows one after another in the machine running direction.

The holes 19 communicate with one another, for which purpose they can preferably be fed simultaneously with lubricant via a transverse bore 22 at right angles to them. The lubricant supply 20 is connected to the transverse bore 22.

The holes 19 are preferably made with their outlet openings at uniform intervals in their region or regions. The hole spacings are preferably in the range between 15 and 25 mm.

The dimensioning of the restrictors is such that the oil supply in the holes 19 is restricted to such an extent that, in spite of possible pressure differences on the shoe 8 in the machine running direction, oil always emerges at all the holes 19 of the additional lubrication, in particular even at points of higher pressing pressure.

In the first exemplary embodiment, where the holes 19 are formed as restrictor holes, their diameter lies in the range from 0.5 to 2.5 mm, with a length of the restrictor holes in the range from 10 to 30 mm, in order to achieve a pressure drop of 5 to 15 bar, in particular 8 to 12 bar. Alternatively, the outlet openings 21 of the holes 19 can have an outlet cross section which is larger but which is preferably below 4 mm.

In principle, there are two possibilities for the oil supply to the additional lubrication. Firstly, as illustrated in FIGS. 1 to 3, the supply is carried out via an additional pump 23, of which the pressure or the delivery rate can be regulated separately from the outside via a pressure regulating valve 24 but which extracts from the same lubricant reservoir 15 as the device 14. In this way, via a feed line 25, there is the possibility of setting the delivery rate for forming an optimal lubricating film for every operating state. Alternatively, not illustrated, the lubricating oil can be branched off from the shoe pressing means. For this purpose, the press chambers 11 of the shoe roll 2 for pressing on the shoe 8 are connected directly to the additional lubrication.

The second exemplary embodiment, illustrated in FIG. 4, differs from the exemplary embodiment described previously only in the fact that restrictor inserts 26 are inserted into the hole 19, to which end the holes 19 each have a restrictor insert section 27 and an end section 28. The end section 28 of the hole 19 ends with the outlet opening 21 at the running surface 9, and its dimensioning is matched to the dimensioning of the restrictor insert 26. The diameter of the hole 19 in the end section 28 can be larger than that of the restrictor insert 26 since, for fabrication reasons, making the end section 28 with a diameter less than 2 mm is more difficult. The end sections 28 preferably have diameters between 2 and 4 mm. The end section 28 of the holes 19 preferably runs at right angles to the running surface 9 in each case. In order to fit the restrictor insert section 27 of the hole 19, an opening provided with a stopper 29 is provided in the bottom region of the shoe 8 and preferably runs at right angles to the bottom surface of the shoe. The restrictor insert 26, together with the end section 27 of the hole, results in a pressure drop in the range from 5 to 15 bar, for which purpose the restrictor insert 26 must be dimensioned appropriately with regard to diameter and length.

Otherwise, the explanations relating to the first exemplary embodiment apply in a corresponding way here.

According to a further exemplary embodiment of the invention, not illustrated, the lubricating oil emerging through the holes 19 is used as the sole lubricating oil supply. The lubricating oil supply described in accordance with the first exemplary embodiment via the holes 19 in the press shoe 8, which supply is connected to a lubricating oil supply 20, is then used as a single device for applying lubricant to the inner side of the roll shell 6, specifically in the press shoe region, while the first device 14 for the lubricant supply can be omitted.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. Apparatus for forming an extended nip between a mating roll and a shoe roll for treating a product web, the shoe roll having a stationary carrier and a flexible roll shell which can rotate around the stationary carrier and which, in the region of the extended nip, is supported on a hydrodynamically lubricated running surface of a press shoe guided on the carrier, said apparatus comprising a device for applying lubricant to the inner side of the roll shell is provided, and, in an inlet region, the press shoe has a plurality of holes in the press shoe which are arranged transversely with respect to the machine running direction, said holes being connected to a lubricant supply in order to receive lubricant and deliver said lubricant to the running surface, said holes having restrictors therein whose resistance provides a pressure drop of 5 to 15 bar, wherein the holes are arranged with their outlet openings in an inlet region of the shoe, where the pressing pressure changes from a region with a high pressing pressure slope into a region with a low pressing pressure slope.

2. Apparatus according to claim 1, wherein the holes can be fed with lubricant via a transverse bore at right angles to them.

3. Apparatus according to claim 1 or 2, wherein the restrictors are formed by the holes designed as restrictor holes.

4. Apparatus according to claim 1 or 2, wherein the restrictors are formed by restrictor inserts.

5. Apparatus according to claim 1 or 2, wherein the restrictors have a diameter in the range from 0.5 mm to 2.5 mm and a length in the range from 10 to 30 mm.

6. Apparatus according to claim 1 or 2, wherein the holes have an outlet opening which is less than 4 mm.

7. Apparatus according to claim 1 or 2, wherein the holes in each case have a restrictor insert whose diameter is smaller than the outlet opening of the hole at the running surface.

8. Apparatus according to claim 1 or 2, wherein the resistance of the restrictors is designed for a pressure drop of 8 to 12 bar.

9. Apparatus according to claim 1 or 2, wherein the hole spacing of the outlet openings of the holes at the running surface lies in the range between 15 and 25 mm.

10. Apparatus according to claim 1 or 2, wherein the holes are made with their outlet openings in a first half of the shoe in the machine running direction.

11. Apparatus according to claim 1 or 2, wherein the holes are arranged with their outlet openings in a first third of the shoe in the machine running direction.

12. Apparatus according to claim 1 or 2, wherein a first device for applying lubricant to the inner side of the roll shell is arranged upstream of a shoe inlet.

13. Apparatus according to claim 12, wherein the first device and the holes are fed from one lubricating oil reservoir.

14. Apparatus according to claim 1 or 2, wherein a plurality of rows of outlet openings of the holes are arranged one after another in the machine running direction.

15. Apparatus for forming an extended nip between a mating roll and a shoe roll for treating a product web, the shoe roll having a stationary carrier and a flexible roll shell which can rotate around the stationary carrier and which, in the region of the extended nip, is supported on a hydrodynamically lubricated running surface of a press shoe guided on the carrier, said apparatus comprising a device for applying lubricant to the inner side of the roll shell is provided, and, in an inlet region, the press shoe has a plurality of holes in the press shoe which are arranged transversely with respect to the machine running direction, said holes being connected to a lubricant supply in order to receive lubricant and deliver said lubricant to the running surface, said holes having restrictors therein whose resistance provides a pressure drop of 5 to 15 bar, wherein a first device for applying lubricant to an inner side of the roll shell is arranged upstream of a shoe inlet and the first device and the holes are fed from one lubricating oil reservoir.

16. Apparatus according to claim 15, wherein the holes can be fed with lubricant via a transverse bore at right angles to them.

17. Apparatus according to claim 15 or 16, wherein the restrictors are formed by the holes designed as restrictor holes.

18. Apparatus according to claim 15 or 16, wherein the restrictors are formed by restrictor inserts.

19. Apparatus according to claim 15 or 16, wherein the restrictors have a diameter in the range from 0.5 mm to 2.5 mm and a length in the range from 10 to 30 mm.

20. Apparatus according to claim 15 or 16, wherein the holes have an outlet opening which is less than 4 mm.

21. Apparatus according to claim 15 or 16, wherein the holes in each case have a restrictor insert whose diameter is smaller than the outlet opening of the hole at the running surface.

22. Apparatus according to claim 15 or 16, wherein the resistance of the restrictors is designed for a pressure drop of 8 to 12 bar.

23. Apparatus according to claim 15 or 16, wherein the hole spacing of the outlet openings of the holes at the running surface lies in the range between 15 and 25 mm.

24. Apparatus according to claim 15 or 16, wherein the holes are made with their outlet openings in a first half of the shoe in the machine running direction.

25. Apparatus according to claim 15 or 16, wherein the holes are arranged with their outlet openings in a first third of the shoe in the machine running direction.

26. Apparatus according to claim 15 or 16, wherein the holes are arranged with their outlet openings in an inlet region of the shoe, where the pressing pressure changes from a region with a high pressing pressure slope into a region with a low pressing pressure slope.

27. Apparatus according to claim 15 or 16, wherein a plurality of rows of outlet openings of the holes are arranged one after another in the machine running direction.

* * * * *